United States Patent
Lehr et al.

(10) Patent No.: US 8,271,400 B2
(45) Date of Patent: Sep. 18, 2012

(54) HARDWARE PAY-PER-USE

(75) Inventors: Robert C. Lehr, Mountain View, CA (US); Arif Sardar, Hayward, CA (US); Matthew Lane, Castle Rock, CO (US); Winthrop Reis, San Mateo, CA (US); Cynthia Alderson, Santa Clara, CA (US); Patrick Allaire, Fremont, CA (US); Richard Birrell, Gilroy, CA (US); Christopher K Buss, Morgan Hill, CA (US); Paula Zimon Clawson, Los Gatos, CA (US); Michael Graf, Flower Mound, TX (US); Arthur F. Green, Los Altos, CA (US); Monica Lasgoity, Palo Alto, CA (US); Susan C. Neidhart, Mountain View, CA (US); Anthony Keith Towles, Garland, TX (US); Carol Uno, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2911 days.

(21) Appl. No.: 10/045,151

(22) Filed: Jan. 15, 2002

(65) Prior Publication Data
US 2003/0135380 A1    Jul. 17, 2003

(51) Int. Cl.
*G06F 17/00* (2006.01)
(52) U.S. Cl. ....................................................... 705/400
(58) Field of Classification Search .................... 705/1.1, 705/400
See application file for complete search history.

(56) References Cited

U.S. PATENT DOCUMENTS

| 5,745,884 | A | * | 4/1998 | Carnegie et al. ................ 705/34 |
| 6,882,439 | B2 | * | 4/2005 | Ishijima ....................... 358/1.15 |
| 2006/0167795 | A1 | | 7/2006 | Suzuki et al. |

FOREIGN PATENT DOCUMENTS

| EP | 1139305 A2 | 10/2001 |
| EP | 1255208 A1 | 11/2002 |
| GB | 2294566 A | 5/1996 |
| GB | 2344265 A | 5/2000 |
| JP | 10091556 A | 10/1998 |
| JP | 2003067657 A | 7/2003 |
| WO | WO01/86933 A2 | 11/2001 |

OTHER PUBLICATIONS

Japanese Patent Application No. 2003-000942 Office Action—Dispatch Date: Jan. 16, 2009.
Great Britain Search Report dated May 13, 2003 issued in counterpart foreign application No. GB 0230345.1.

* cited by examiner

*Primary Examiner* — Dennis Ruhl

(57) ABSTRACT

A hardware pay-per-use system and corresponding method allow computer system operators to tailor their hardware utilization to more closely match changing customer demands. The hardware pay-per-use system includes one or more hardware products and a metering mechanism coupled to at least one of the hardware products. The metering mechanism includes a hardware device separate from the hardware products. The metering mechanism acquires metrics data from the hardware products, the metrics data related to an operation at the hardware products. The metering mechanism determines data to report on the operation of the hardware products. A usage repository coupled to the metering mechanism receives the determined data and generates usage reports related to the operation of the hardware products.

39 Claims, 4 Drawing Sheets

HARDWARE PAY-PER-USE

TECHNICAL FIELD

The technical field is pricing of hardware on a per-use basis.

BACKGROUND

Many businesses, especially Internet-based enterprises, face increasing demands for computing capacity. As these demands for computing capacity have grown, a typical approach has been to continue to acquire enough computing capacity (i.e., hardware devices) to meet some service level objective, which was usually in excess of a normal service level. Alternately, or in addition, additional computing capacity may be desirable in the event of a casualty that results in loss of one or more hardware devices so as to maintain uninterrupted the desired service level. This traditional approach to acquiring computing capacity translates into costly oversizing or the risk of low service levels. For example, to provide service at an Internet Web site, the Web site operator might acquire enough server capacity to handle 80 percent of peak load. This meant that at peak, some Web site customers might not be able to access the Web site, while at off-peak hours, some servers might be idle. The closer the Web site operator tried to come to handling peak load, the larger the idle server capacity would be in off-peak hours.

SUMMARY

A hardware pay-per-use system and corresponding method allow computer system clients to tailor their hardware utilization to more closely match changing customer demands. The system and corresponding method allow a client to react quickly to changes in demand or hardware failure and to maintain desired service levels without expensive acquisition of excess hardware capacity. The system and method incorporate flexible pay-per-use pricing plans based on data gathered from hardware products by a mechanism separate and distinct from the hardware products.

In an embodiment, the hardware pay-per-use system includes one or more hardware products and a metering mechanism coupled to the hardware products. The metering mechanism includes a hardware device separate from the hardware products. The metering mechanism acquires metrics data from the hardware products, the metrics data related, for example, to usage of the hardware products. The metering mechanism determines data to report on the usage of the hardware products. A usage repository coupled to the metering mechanism receives the determined data and generates usage reports related to the hardware products. In addition, billing reports and invoices may be generated based on the usage data.

A method for pricing hardware on a pay-per-use basis, wherein one or more hardware products are coupled to a communications network, includes acquiring, in a hardware device separate from one or more hardware products, metrics data related to an operation, such as usage, of the hardware products; determining data to report based on the acquiring step; sending the determined data to a usage repository; generating a usage report; and generating a pay-per-use billing report and an invoice based on the usage report.

DESCRIPTION OF THE DRAWINGS

A hardware pay-per-use system, and corresponding method, will be described in detail with reference to the following figures, in which like numerals refer to like elements, and in which.

DETAILED DESCRIPTION

Figure 1:
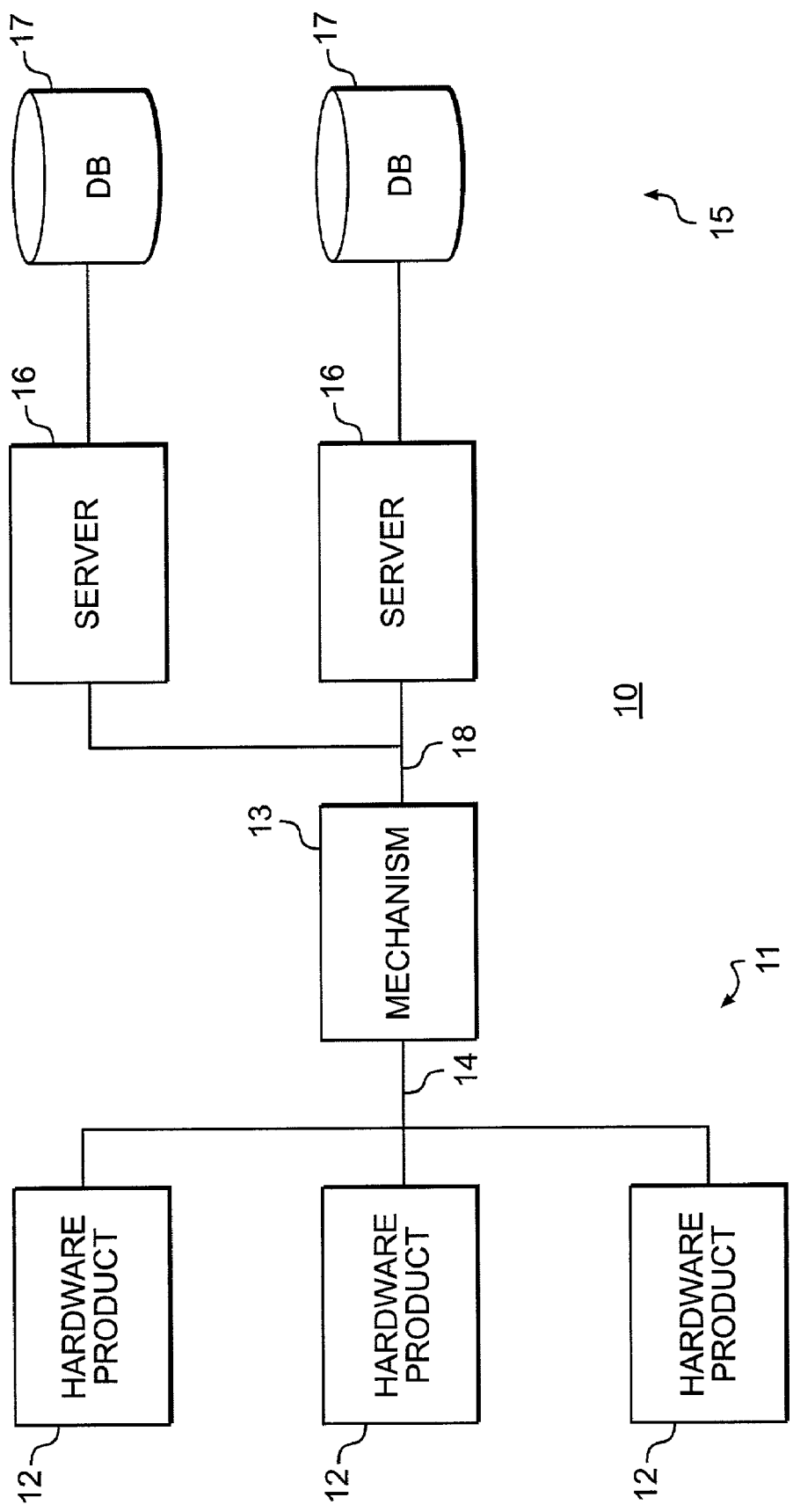
FIG. 1 is a block diagram of a hardware pay-per-use environment.

FIG. 1 is a block diagram of a hardware pay-per-use environment 10 that allows for flexible pricing of hardware products. The flexible pricing may apply to any number of financing models, including leasing, pre-payment, capital purchase, rent-to-own, purchase and trade-in, and other financing models. The environment 10 includes a client side 11 having one or more hardware products 12. Also included is a mechanism 13 capable of obtaining data related to operation of the hardware products 12. The hardware products 12 are coupled to the mechanism 13 through a connection 14. Coupled to the client side 11 through a connection 18 is a server side 15. The server side 15 may include one or more servers 16 to process data and to support the flexible pricing, and one or more databases 17 to store data related to the flexible pricing.

The hardware products 12 may be servers designed to operate in a networked computer system. However, the hardware products 12 may be any hardware devices that may be attached to a network, and from which metrics data may be obtained. In the environment 10 shown in FIG. 1, the hardware products 12 are leased to a client at the client side. In an alternative embodiment of the environment 10, the hardware products 12 may be provided based on other financing models, such as pre-payment, capital purchase, rent-to-own, purchase and trade-in, and other financial models, for example. The hardware products 12 may be designed to meet a service level specified by the client. For example, the client side 11 may be an Internet Web site, the hardware products 12 may be Web servers, and the number of Web servers leased may be chosen by the client so that an expected peak demand at the client side 11 may always be satisfied through operation of the Web servers. Under these assumptions, the hardware products 12 (Web servers) may not realize 100 percent or near 100 percent utilization for much of any given time period. As a consequence, and under a traditional hardware product leasing plan, the client would pay for excess capacity that may be seldom used, in order to guarantee an acceptable service level during hours of peak operation. The environment 10 solves this problem by a flexible financing model based on a pay-per-use scheme. The pay-per-use scheme provides that the client pay for hardware products 12 based, at least in part, on metrics data acquired from the hardware products 12 by the mechanism 13. The metrics data may relate to, or measure, some operational aspect of the hardware devices 12, such as a period of time the hardware devices 12 are actually in use, for example. Other metrics data, including configuration data, may also be used as a basis for billing in the pay-per-use scheme.

The hardware products 12 that are leased to the client in the environment 10 may be provided by an operator of the server side 15, or by an entity related to the operator of the server side 15. Alternatively, the provider of the hardware products 12 and the operator of the server side 15 may be unrelated entities.

The mechanism 13 may be provided at the client side 11 by the provider of the hardware products 12, the operator of the server side 15, or another entity unrelated to the provider or the operator. The mechanism 13 may be an appropriately programmed hardware device that is physically distinct from the hardware products 12. The mechanism 13 may be implemented as a hardware device in a rack mountable system in which the hardware products 12 are also mounted. In this embodiment, the mechanism 13 may be a standalone device. The mechanism 13 may also be implemented on a suitably programmed general purpose computer, including a laptop or notebook computer, a desk top computer, a server, and a main frame computer. The mechanism 13 may not be resource-intensive, and may be implemented as a device with less computing capability than the hardware products 12. The mechanism 13 may incorporate features (not shown) that allow the client at the client side 11 to obtain information related to operation of the hardware products 12. For example, the client may be able to query the mechanism 13 to obtain a running bill for operation of the hardware products 12, or to obtain metrics data collected by the mechanism 13.

When the mechanism 13 is provided at the client side 11, the connection 14 may be any connection capable of transmitting digital data, and the connection 18 may be the Internet, or a similar public network capable of transmitting digital data.

In an alternative embodiment of the environment 10, the mechanism 13 may be located at the server side 15. In this embodiment, the connection 18 may be any medium capable of transmitting digital data, and the connection 14 may be a public network, such as the Internet, that is capable of transmitting digital data.

Figure 2:
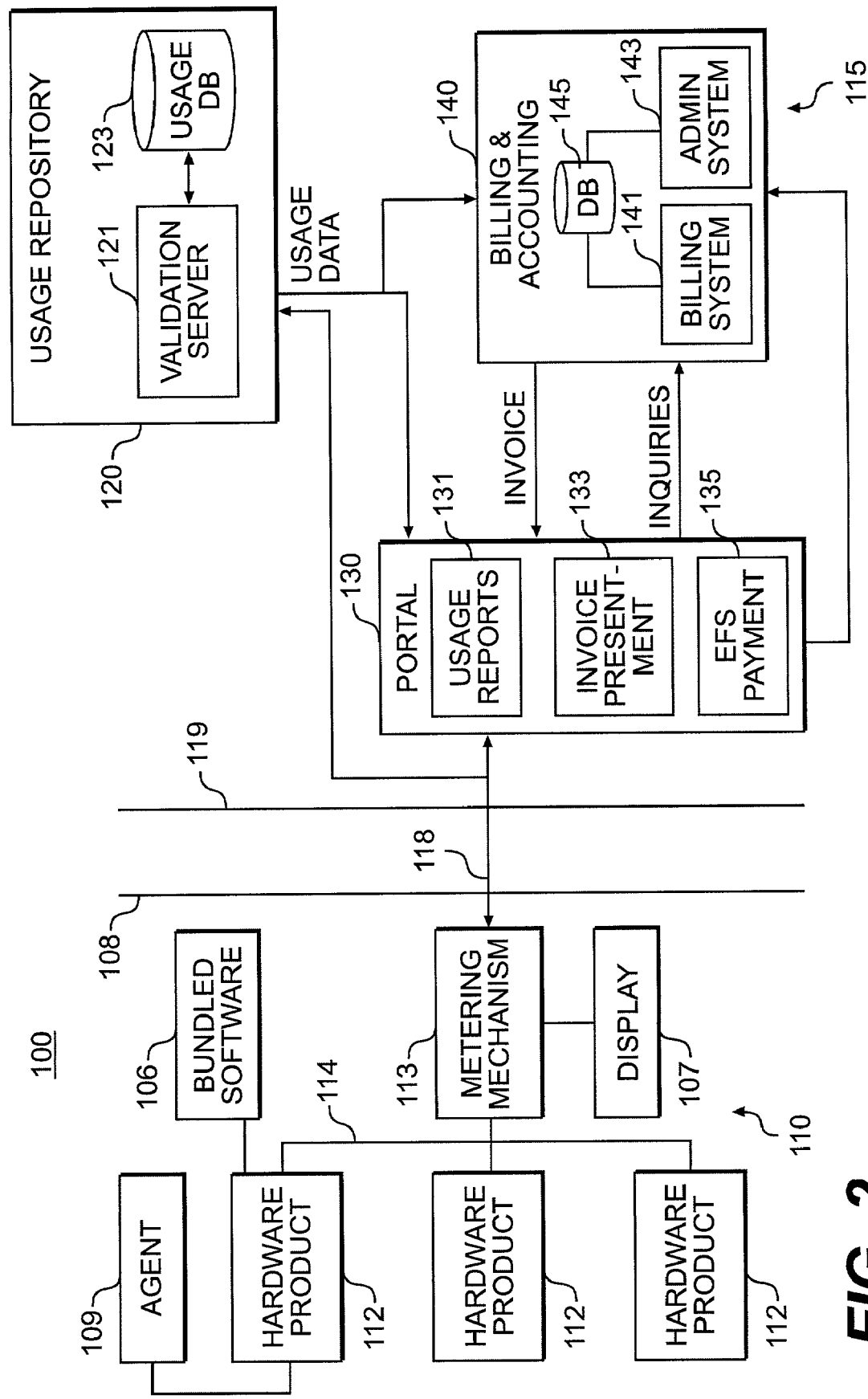
FIG. 2 is a detailed block diagram of a hardware pay-per-use system.

FIG. 2 is detailed block diagram of one possible hardware pay-per-use system. A hardware pay-per-use system 100 includes a client side 110 and a server side 115. The client side 110 is coupled to the server side 115 by connection 118, client-side firewall 108 and server side firewall 119. The connection 118 may be any connection capable of transmitting digital data. In an embodiment, the connection 118 is a communications network, and the client side 110 is an Internet Web site. In an alternative embodiment, the connection 118 is a communications link in a local area network (LAN), and the client side 110 and the server side 115 are nodes in the LAN. Those of ordinary skill in the art will appreciate that the system 100 shown in FIG. 2 can be adapted to any network or environment in which digital data are passed from one node to another node.

The client side 110 is shown with three hardware products 112 coupled to a metering mechanism 113, which may include a display 107. However, the client side 110 may include any number of hardware products 112. In an embodiment, additional metering mechanisms 113 may be emplaced at the client side 110 should the number of hardware products 112 exceed a capacity of a single metering mechanism 113. The functions of the metering mechanism 113, and its relation to the hardware products 112, will be described in detail later. Coupled to one or more of the hardware products 112 may be a metering agent, such as the agent 109. The hardware products 112 may also include bundled software, such as the bundled software 106.

In an alternate embodiment of the system 100, the metering mechanisms 113 are located at the server side 115 on the server side of the firewall 119. In this embodiment, the metering mechanism 113 communicates with other devices at the server side 115 using a digital data transmission medium, and communicates with the hardware products 112 at the client side 110 using Virtual Private Network (VPN) technology, or similar technology, implemented on a public network, such as the Internet, or other network capable of transmitting digital data through the firewalls 119 and 108.

The server side 115 includes a usage repository 120 that receives data from the metering mechanism 113. The usage repository 120 includes means for receiving metrics data associated with the hardware products 112, validating the metrics data, and storing the data. In an embodiment, the means for receiving, validating, generating and storing is a utility validation server 121. The usage repository 120 may also include means for generating usage reports based on metrics data. The server 121 may store processed and raw (unprocessed) data and the usage reports in one or more usage databases 123.

Coupled to the usage repository 120 are a portal 130 and a billing and accounting system 140. The portal 130 provides communications means that allow a client at the client side 110 to interact with the server side 115, and provide a means for bill presentation and payments in the hardware pay-per-use system 100. The portal 130 also allows the client at the client side 110 to view data associated with the hardware products 112. In an embodiment, the portal 130 may provide for display of data from the server side 115 onto the display 107 at the client side 110. An example of this data includes hardware product usage reports that may be generated at the usage repository 120. The billing and accounting system 140 provides means for generating billing information, receiving and crediting payments from the client side 110, completing other administrative tasks and storing data related to these functions.

Returning to the client side 110, the hardware products 112 may be servers that are leased from an operator of the server side 115. The hardware products 112 may also be other leased, computer-related hardware devices, including printers, desktop computers, and other hardware devices. In addition to a leasing model, other financial models, such as prepayment, capital purchase, rent-to-own, purchase and trade-in, and other financial models may be used to provide the hardware products 112. Although the system 100 shown in FIG. 2 illustrates the hardware pay-per-use concept in the context of a networked computer system, i.e., the system 100, the hardware pay-per-use concept may be used for other hardware environments in which metrics data related to operation of the hardware products can be collected from the hardware products and provided to a remote location for usage and billing purposes. In another embodiment of the system 100, the hardware products 112 may be acquired from a hardware vendor, and the monitoring and billing functions may be executed by a third-party vendor. In still another embodiment, the system 100 is a LAN with the client side 110 as one of one or more nodes in the LAN, and the server side 115 as a central node on the LAN. In this later embodiment, the server side 115 tracks hardware product usage by the client side 110, and may establish internal billing for use of the hardware products 112.

The metering mechanism 113 acquires usage or metrics data from one or more of the hardware products 112. The metering mechanism 113 may be a standalone hardware device that is suitably programmed to acquire the metrics data. For example, the metering mechanism may be a rack-mounted component coupled to the hardware products 112. Alternatively, the metering mechanism 113 may reside on a non-pay-peruse hardware component, such as an administrative server, for example, at the client side 110. In an embodiment, the metering mechanism 113 contains metrics-data acquisition software, such as Hewlett-Packard Open View Internet Usage Manger (IUM) running as the only application on a separate, no maintenance, Linux-based system residing at the client side 110. In yet another embodiment in which the metering mechanism 113 resides at the server side 115, the metering mechanism 113 may be a standalone hardware device, or may be incorporated into one or more components on the server side 115, such as the usage repository 120, for example. When the metering mechanism 113 is implemented at the server side 115, VPN technology, or other similar technology that allows the hardware products 112 to communicate with the metering mechanism 113, may be used in connecting the hardware products 112 to the server side 115.

The metering mechanism 113 may acquire the metrics data on a periodic or non-periodic basis. One approach to collecting the metrics data relies on a polling operation. In the polling operation, the Internet protocol (IP) addresses of each of the hardware products 112 is entered into the metering mechanism 113. The entry of the IP addresses may be completed using a graphical user interface (GUI), for example. The metering mechanism 113 then polls the hardware products 112 at the client side 110 using the IP addresses in order to retrieve the metrics data. The hardware products 112 receive the polling command, and initiate action to collect the required metrics data. Such collection may rely on the metering agent 109, which may be a Windows® or Linux agent, for example, incorporated into each of the hardware products 112. In addition, each of the hardware products 112 may have a different polling interval, even for like or similar hardware products 112.

In an alternative to polling, the metering mechanism 113 may rely on the metering agents to collect the metrics data without polling. In this embodiment, metering agents, such as the metering agent 109, collect the metrics data continually or at specified collection intervals and initiate communication with the metering mechanism 113. The metering mechanism 113 may be set to receive metrics data from the metering agents 109.

The metering mechanism 113 may acquire metrics data several times per hour, depending on the type of metrics data that is being collected. For example, the metering mechanism 113 may be set to acquire data every 20 minutes for a total of 72 intervals per day. Other acquisition intervals, however, may be specified depending on the type of metrics data being collected. Frequent acquisition may be desired for instantaneous, or snapshot metrics; however, frequent polling would not be as critical for cumulative metrics. The metering mechanism 113 may have a single acquisition interval in order to simplify matters.

The metering mechanism 113 may acquire metrics data from the hardware products 112 using a variety of techniques. The metrics data may be acquired in a variety of formats. The metering mechanism 113 may acquire different metrics data from different hardware products 112, and the hardware products 112 at any one client side need not be identical or even similar types of hardware devices. The metering mechanism 113 may perform some pre-processing of the metrics data, and may send the pre-processed metrics data to the usage repository 120 after suitable compression and encryption.

The metering mechanism 113 may communicate with the hardware products 112 through a network management protocol such as Simple Network Management Protocol (SNMP) or Web-Based Enterprise Management (WBEM) protocol, both of which allow polling of information. The metering mechanism 113 and the hardware products 112 also can communicate using a Desktop Management Interface (DMI), or similar framework for network management. The metering mechanism 113 and the hardware products 112 may communicate and transmit data using protocols that are not specifically dedicated to network management, such as Hypertext Transport Protocol (HTTP) or Secure HTTP (HTTP/S).

As noted above, the hardware products 112 may incorporate the metering agent 109 to communicate with the metering mechanism 113. The implementation of the metering agent 109 will depend on the particular communication protocol being used. In a SNMP implementation, the metering agent 109 is implemented as a SNMP agent or sub-agent. If WBEM/DMI is the communication protocol, a WBEM/DMI data provider serves as the metering agent 109. A CGI program accessible to a Web server could be used as the metering agent 109 if HTTP or HTTP/S is used as the communication protocol.

Metrics data returned by the hardware products 112 may use a standardized data structure such as one specified by management information base (MIB) for SNMP or by the Managed Object Format (MOF) for WBEM. In a SNMP implementation, for example, a MIB can be specified for returning certain data to the metering mechanism 113. The MIB could be compiled into a data structure and downloaded to the metering agent 109 (implemented, for example, as a SNMP subagent) where the data structure would be used in collecting data. Other data structures may be used to implement the transfer of the metrics data between the hardware products 112 and the metering mechanism 113.

The particular metrics data gathered from the hardware products 112 depend on the particular hardware product 112 and a particular business model for charging for use of the hardware products 112. One type of metrics data that may be acquired is a snapshot metric, which represents a snapshot of the current state of the hardware products 112 at the client side 110. One common type of snapshot metric, for example, is the number of hardware products 112 operating at the client side 110 at any one time. Cumulative metrics data, which measure the total accumulated value of a given parameter, may also be acquired by the metering mechanism 113. Such cumulative metrics data include the number of transactions or the number of files being produced for a given pre-determined time interval, for example. Other metrics data include central processing unit (CPU) utilization or execution time and input/output (I/O) metrics such as number of I/O reads or writes. Still other metrics data include how much memory out of available memory is being used at any time, how much hard disk, or other mass storage, is used at any time; bandwidth-related metrics such as the number of megabytes transmitted through a network interface card (NIC) over a given time; the number of files accessed over a given time; and the number of connected users, for example.

The client may also specify (and the server side operator agree to) client-supplied metrics data on which the pay-per-use bill or invoice is based. For example, the client side 110 may be an online brokerage company. In this example, the pay-per-use bill may be based on a number of trade transactions processed through the brokerage company's Web server(s) (the hardware products 112) over a given time. The number of transactions may be determined by a metering agent provided by the server side operator or other third-party entity, where the metering agent is installed on the hardware products 112 at the client side 110, as described above. Thus, the system 100 is able to accommodate customized schemes for reporting and using metrics data so as to most accurately account for hardware product usage by a specific client.

The metering mechanism 113 may return the metrics data in a specific predetermined data interface, such as a colon-separated variable text format or rows of variable/value groups, that is compatible with the metering mechanism 113. The metrics data may be in binary format or in text format, for example.

The metering mechanism 113 may periodically report or transmit the accumulated metrics data to the server side 115. The reporting periodicity may be determined on a calendar basis, on an accumulated number of bytes of data, or some other basis. For example, the metering mechanism 113 may accumulate one days worth of metrics data from the hardware products 112. At a specified time, the metering mechanism 113 may establish communications with the server side 115, and then upload the accumulated metrics data.

When implemented at the client side 110, the metering mechanism 113 may acquire the metrics data from the hardware products 112, and, at a specified time, may establish communications with the server side 115 to transmit the metrics data. Such communications may be established by the metering mechanism 113 using an IP address of the server side 115 to open a communications path, for example. In this embodiment, metrics data transmission is initiated by the metering mechanism 113, and the server side 115 may initiate queries, such as e-mail messages with the client side 110. The metrics data are then "pushed" to the server side 115.

When implemented at the client side 110, the metering mechanism 113 may transmit the metrics data to the server side 115 using a variety of known protocols, and network transport mechanisms, including HTTP and HTTPLS, for example. The transmission may be automatic, using a proxy server (not shown) at the client side 110, and/or Network Address Translation (NAT) to communicate through the firewalls 108 and 119 over the Internet. The metering mechanism 113 may also transmit the metrics data using e-mail by way of the Internet.

When implemented at the server side 115, as described above, the metering mechanism 113 may initiate acquisition of the metrics data from the hardware products 112 by, for example, using an IP address of the client side 110 and the hardware products 112. The metering mechanism 113 then "pulls" the metrics data from the client side 110.

When implemented at the server side 115, the metering mechanism 115 may use network transport mechanisms and protocols, as described above, to acquire the metrics data from the hardware products 112.

The metering mechanism 113, when implemented at the client side 110, may receive any patches, or software updates from the server side 115. The metering mechanism 113 may query the server side 115 periodically, such as daily, to receive such updates. Alternatively, the metering mechanism 113 may receive the updates upon communicating with the server side 115 for the purpose of transmitting the metrics data. Thus, the metering mechanism 113 incorporates the capability to be dynamically updated. Similarly, the metering mechanism 113 may receive patches for updating operation of one or more of the hardware products 112.

The metering mechanism 113 also provides the client side 110 with the means for updating a configuration of the hardware products 112. For example, should an additional hardware product 112 be added at the client side 110, the metering mechanism 113 can provide updated hardware product information to the server side 115, including an identity of the additional hardware product 112, and any metrics data that will be gathered from the new hardware product 112. The stored hardware product configuration can also be downloaded to the client side 110 should an existing metering mechanism 113 be replaced, or should an additional metering mechanism 113 be added at the client side 110.

Figure 3:
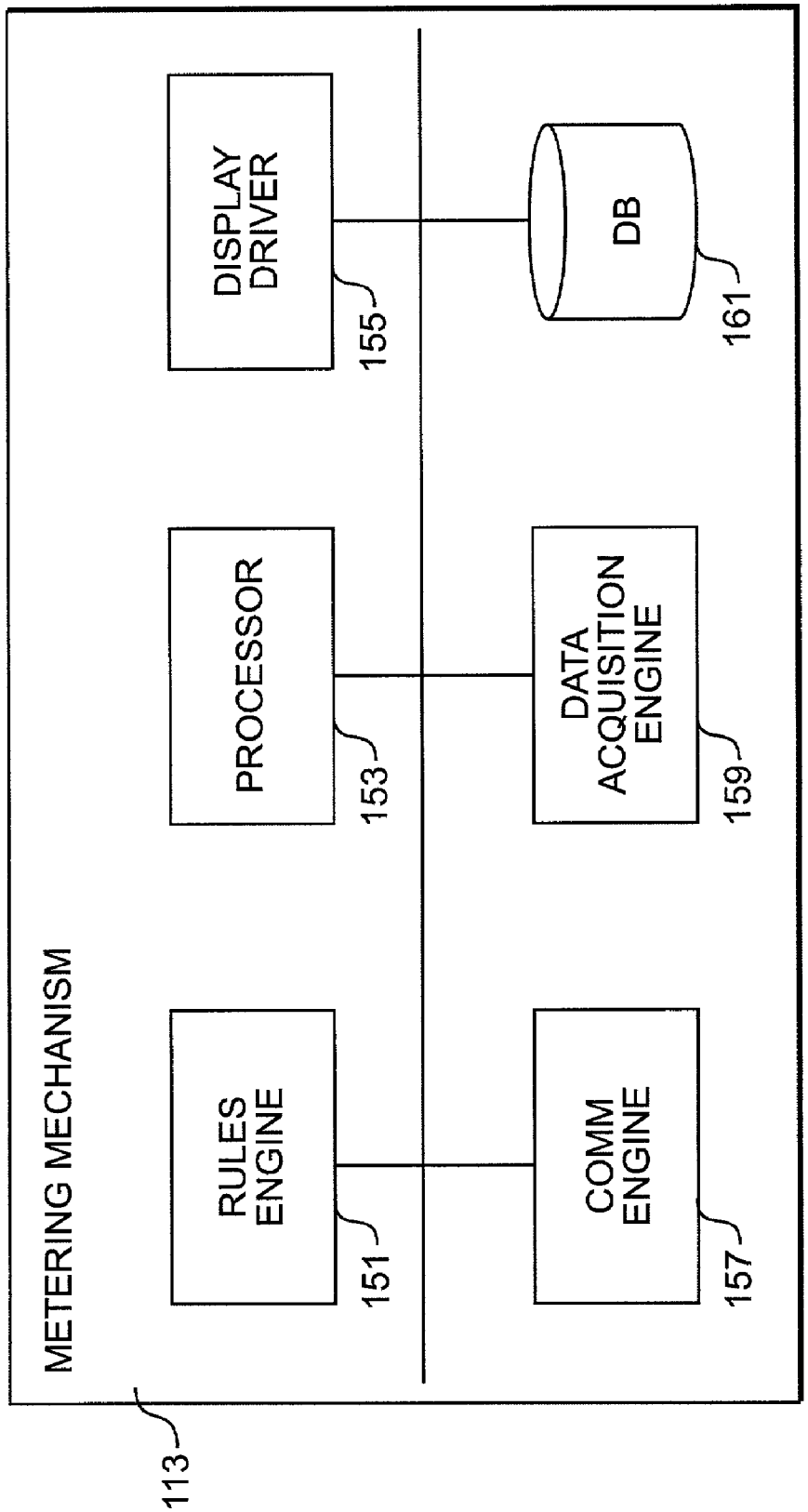
FIG. 3 is a block diagram of a metering mechanism used with the system of FIG. 2.

The metering mechanism 113 may incorporate many components or features that allow operation in a variety of network environments. FIG. 3 is a block diagram showing an embodiment of the metering mechanism 113 that may be implemented at the client side 110. The metering mechanism 113 includes a rules engine 151, a processor 153, a display driver 155, a communications engine 157, a data acquisition engine 159, and a database 161. The rules engine 151 may be programmed with generic and specific rules that relate to the capture and reporting of metrics data from the hardware products 112. For example, the metering mechanism 113 may be designed, for the specific client side 110, to continually acquire CPU utilization, and to record CPU utilization every five minutes. The rules engine 151 may be programmed to require that the CPU utilization value reported to the server side 115 be a peak CPU utilization for each five minute interval. Alternatively, a rule could specify that an average CPU utilization for each five minute interval is to be reported to the server side 115. The rules in the rules engine 151 may also relate to a pay-per-use pricing plan agreed to by the client and the server side operator. For example, the pay-per-use pricing plan may specify a first billing rate, which may be a flat or minimum fee, if average CPU utilization over a 24-hour period is less than 20 percent, and a second billing rate, which may vary, if the CPU utilization is equal to, or greater than, 20 percent.

The processor 153 may provide a variety of computing functions for the metering mechanism 113 and may control operation of the metering mechanism components. The processor 153 may also provide some pre-processing of the metrics data acquired from the hardware products 112. For example, the processor 153 may produce an average of CPU utilization for each five minute interval in a day. The processor 153 operates with the rules engine 151 to ensure that metrics data as specified by the pay-per-use pricing plan is acquired, processed and packaged for transmission to the server side 115. For example, if the pay-per-use pricing plan specifies that the hardware product financing rate will be based on average CPU utilization, with the average determined over each five minute interval, the processor 153 will compute the average CPU utilization, and will make the average CPU utilization available for transmission to the server side 115. The processor 153 may also incorporate certain data path integrity checks. For example, the processor 153 may incorporate routines for testing the hardware product to metering mechanism transport mechanism, such as SNMP, WBEM or HTTP, by obtaining a known response from the metering agent 109.

The display driver 155 may include software required to display information to the client at the client side 110. The information may be displayed on a monitor, a printer, or other display device that is coupled to the metering mechanism 113. The information may also be displayed over the network 118 to a Web browser installed on a hardware device at the client side 110. Examples of information that may be displayed at the client side include instantaneous and average CPU utilization, total or average CPU utilization over 24 hours, and other metrics data, including pre-processed metrics data collected at the metering mechanism 113 and diagnostic and help information.

The communications engine 157 includes the necessary programming to encrypt, compress, and package the metrics data, including pre-processed metrics data, for transmission to the server side 115 in a format that is compatible with the connection 118 and the server side components.

The data acquisition engine 159 includes the programming needed to acquire data from the hardware products 112. The programming includes the necessary interfaces to communicate with any metering agents installed on the hardware products 112. The programming may also dictate the manner in which metrics data is to be acquired. For example, the programming may specify that the metering mechanism 113 is to poll each of the hardware products 112 at a specific interval (e.g., every five minutes) to retrieve the required metrics data. The data acquisition engine 159 may also digitally sign the metrics data so that any data tampering may be detected.

The database 161 stores a variety of data related to the pay-per-use pricing plan. The database 161 may store metrics data, including pre-processed metrics data, prior to transmission of the metrics data to the server side 115. For example, the database 161 may store metrics data for 24 hour intervals, with the metering mechanism 113 transmitting the metrics data to the server side 115 every 24 hours. The database 161 may continue to store the metrics data until the metering mechanism 113 receives a direction from the server side 115 that the metrics data may be deleted from the database 161. In this way, the server side 115 may validate, and ensure the accuracy and adequacy of, the metrics data before the metrics data are deleted. The database 161 may store other data and information, such as hardware product configuration, bills or invoices, and other information related to the operation and administration of the pay-per-use pricing plan.

As noted above, the metering mechanism 113 periodically transmits the metrics data to the server side 115. The periodicity for reporting metrics data may vary from client side to client side, and within a specific client side, may vary from hardware product to hardware product. In an embodiment of the system 100, the metrics data are transmitted to the server side 115 daily. If, after a specified time, such as three days, the server side 115 has not received any metrics data from the client side 110, an e-mail notification may be sent to a specified e-mail address at the client side 110. Alternatively, or in addition, should metrics data for the client side 110 not be received at the server side 115, then the client side 110 may be charged a set fee for the period for which no metrics data were delivered. For example, the client could be invoiced at 50 percent of maximum utilization for every period not covered by the metrics data. The usage repository 120, and in particular the validation server 121, then process the collected metrics data as a step in completing a bill or invoice for usage of the hardware products 112. The validation server 121 may decrypt and decompress the metrics data, and then execute a number of routines to validate the data prior to processing for bill generation.

The validation server 121 may perform one or more validation or audit functions based on the metrics data received from the client side 110. A first, or configuration, validation function may relate to ensuring an original, approved configuration of the hardware products 112 at the client side 110 has not been altered or modified by the client or some other entity. The configuration validation may be based on a configuration file for the client side 110 that is stored in the usage database 123. As noted above, as the hardware product configuration at the client side 110 changes (through approved processes, such as revised financing arrangements, or hardware product upgrades), the hardware product configuration file for the client side 110 may be updated. The hardware product configuration, in the case of a Web server, for example, may be changed by adding or subtracting a processor, adding or subtracting memory, or adding or subtracting hard drives.

As an alternative means for validating the configuration, the validation server 121 could note the hardware product configuration when metrics data are received from the client side 110, and may store this configuration in the usage database 123. The next time that the validation server 121 receives metrics data from the same client side 110, the validation server 121 may receive the current hardware product configuration. The validation server 121 may then compare the current hardware product configuration to the previous hardware product configuration stored in the usage database 123. Any differences in hardware product configuration may be noted, and may cause the validation server 121 to execute a specific action, including, for example, generation of an error message for display to operators of the server side 115. An updated hardware configuration file may be available to the client through the metering mechanism 113, or, as discussed below, through the portal 130.

Other validation functions may relate to the format and acceptability of the metrics data. For example, the validation server 121 may ensure the metrics data are not corrupted, that the metrics data received from the client side 110 falls within a range of expected values for the data, and other validation checks. As a specific example, if the client side 110 has three Web servers as the hardware products 112, and the received metrics data relates to hours or percentage of CPU utilization, then the maximum number of hours for all three Web servers in one day would be 24 hours each, and the maximum percent CPU utilization would be 100 percent. Any metrics data exceeding these maximum values would be in error, and the validation server 121 could note the error event, halt processing, and generate an error message. The validation server 121 could incorporate other criteria or rules by which to judge the accuracy and adequacy of the received metrics data. The validation server 121 may also check the received metrics data to determine if someone has tampered with the metrics data as collected at the hardware products. This tamper checking process may be executed by using the digital signature, mentioned above, that may be appended to the metrics data by the metering mechanism 113. Other error-checking and testing routines may be incorporated into the system 100. For example, the integrity of the client side to server side transport mechanism, where the transport mechanism uses HTTP or HTTPLS protocols, may be verified by uploading a test file from the metering mechanism 113 to the usage repository 120.

The usage database 123 stores metrics data, including metrics data pre-processed by the metering mechanism 113 and processed by the validation server 121, and unprocessed metrics data for each of the connected client sides 110. The usage database 123 also stored hardware product configuration data, usage reports, and other data related to operation and administration of the pay-per-use pricing plan.

Returning to FIG. 2, the portal 130 serves as a communications interface between the client side 110 and the server side 115. The portal 130 provides means by which the client may view data at the server side 115, and means for bill presentment and payment. The portal 130 includes a usage reports mechanism 131 by which the client may be presented with information related to operation of the hardware products 112. In particular, the usage reports mechanism 131 may provide the client with access to all processed and unprocessed metrics data for the client side 110. The usage reports mechanism 131 may also provide means for the client to communicate with the server side 115, to inquire about the hardware products 112, the pay-per-use lease plan and other administrative and accounting matters. Access to the portal 130 by the client may be controlled using various security measures such as a user name and password, for example. A bill presentation mechanism 133 may be used to provide the client side 110 with an electronic copy of a current bill or invoice. The mechanism 133 may provide the invoice as an e-mail attachment, a down loadable electronic file posted on a server Web site, or any other form of electronic bill presentment. A bill payment mechanism 135 may allow the client to pay for lease of the hardware products 112 using a standard form of electronic funds transfer; payment by credit card or other form of payment over a communication network. The bill payment mechanism 135 may also provide a toll-free (800) number by which the client can call to arrange a payment on the invoice.

The billing and accounting system 140 includes a billing system 141, a administration system 143, and a billing/administration database 145. The billing system 141 receives usage data from the usage repository 120, and generates a bill or invoice for presentment to the client using the portal 130. The administration system 143 performs various administrative function for the server side 115. The database 145 stores various billing and administrative data, including client data.

As shown in FIG. 2, the billing and accounting system 140 is incorporated into the server side 115. However, the billing and accounting system 140 may be located at a site remote from the server side 115, and may be operated by an entity other than the server side operator.

Figure 4:
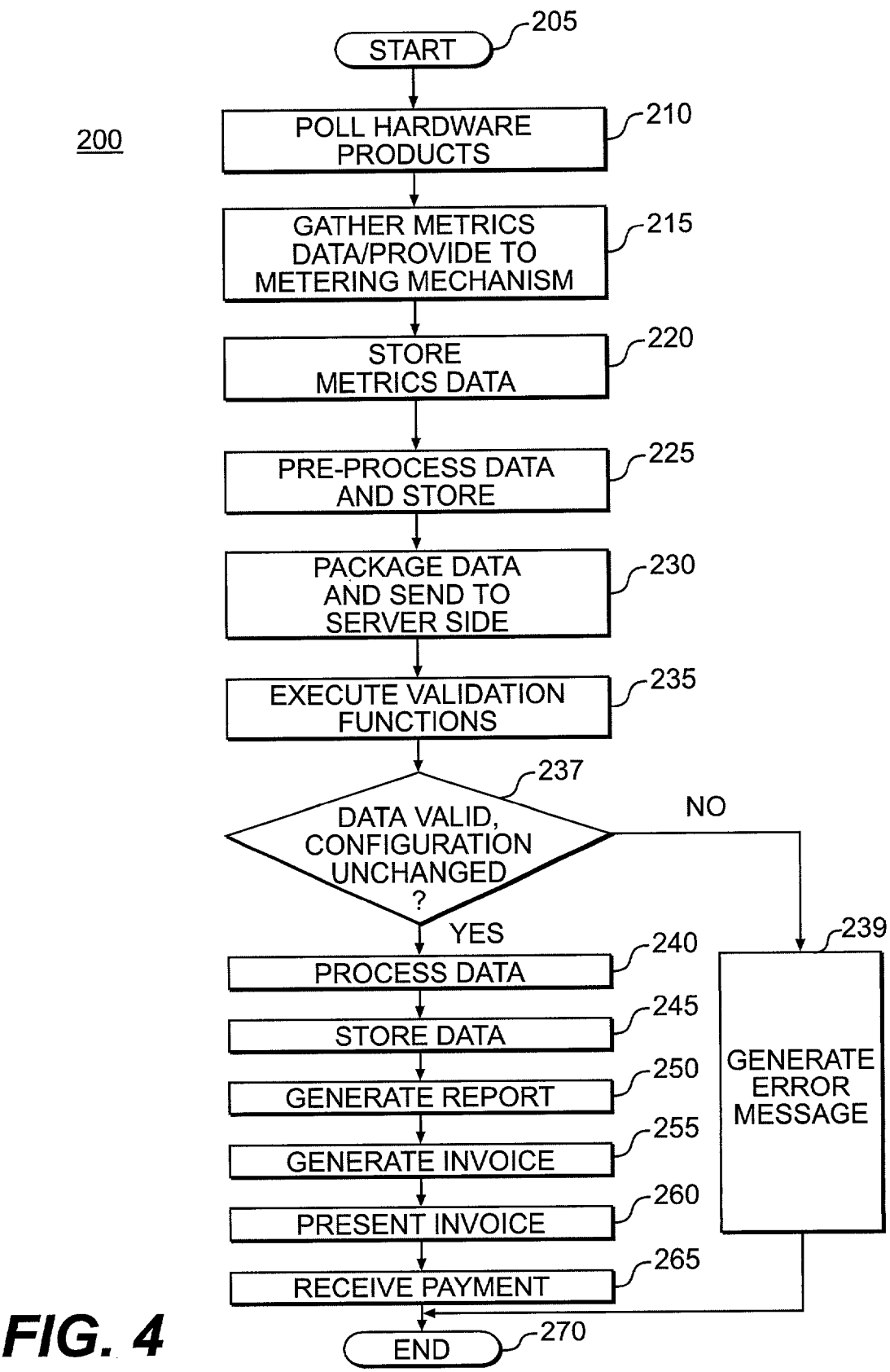
FIG. 4 is a flowchart illustrating an operation of the system of FIG. 2.

FIG. 4 is a flowchart illustrating an operation 200 of the system 100 of FIG. 2 in which the metering mechanism 113 is located at the client side 110. The operation 200 relates to metrics data collection and billing, and begins in block 205. In block 210, the metering mechanism 113 polls the hardware products 112 at the client side 110 in order to retrieve metrics data. In block 215, the hardware products 112 receive the polling command, and initiate action to acquire/or provide the required metrics data. Such acquisition may rely on a metering agent incorporated into each of the hardware products 112. In addition, each of the hardware products 112 may have a different polling interval, even for like or similar hardware products 112. The hardware products 112 then transmit the metrics data to the metering mechanism 113.

In an alternative to polling, the metering mechanism 113 may rely on the metering agents to provide the metrics data without polling. In this embodiment, the metering agents collect the metrics data at specified collection intervals and initiate communication with the metering mechanism 113. The metering mechanism 113 may be set to receive metrics data from the metering agents. The metering mechanism 113 may collect metrics data several times per hour, depending on the type of metrics data that is being collected. For example, the metering mechanism 113 may be set to collect data every 20 minutes for a total of 72 intervals per day.

In yet another alternative, the metering mechanism 113 may access certain operating data related to the hardware products 112 in order to gather the metrics data.

In block 220, the metering mechanism 113 stores the collected metrics data. In block 225, the metering mechanism 113 may perform any required pre-processing of the acquired metrics data. Any pre-processed metrics data may then be stored in a database in the metering mechanism 113.

In block 230, the metering mechanism 113 encrypts, compresses and packages the metrics data for transmission to the server side 115, and then transmits the data package. Transmission of the data package may normally be initiated by the metering mechanism 113, when the metering mechanism 113 is implemented at the client side 110. When implemented at the server side 115, the metric mechanism 113 may initiate on-demand transmission of the metrics data. In both embodiments, the transmission may occur at predetermined intervals, or when other criteria, such as accumulation of a specified number of bytes, are satisfied.

In block 235, the validation server 121 at the server side 115 receives the data package, decompresses and decrypts the data package, stores the decrypted data, and performs any desired data validation routines, including routines to verify the configuration of the hardware products 112. In block 237, the validation server 121 determines, based on execution of the validation routines, if the metrics data are valid, and if the hardware product configuration is unchanged. If both conditions are met, the operation moves to block 240. Otherwise, the operation 200 moves to block 239, and an error message is generated. Following block 239, the operation 200 moves to block 270 and ends.

In block 240, the validation server 121 processes the metrics data according to the pay-per-use pricing plan for the client side 110. In block 245, the processed metrics data are saved in the usage database 123.

In block 250, after sufficient processed metrics data have been stored in the usage database 123, the validation server 121 generates a usage report, saves the usage report in the usage database 123, and provides the usage report to the portal 130 and the billing and accounting system 140. In block 255, the billing system 141 generates an electronic invoice, and posts the invoice at the portal 130. In block 260, the portal 130 presents the invoice to the client side 110. Such presentment may be by way of an e-mail notification, or by sending the invoice directly to the client side 110. In block 265, the server side 115 receives payment based on the invoice. Such payment may be by way of electronic funds transfer, for example. The operation 200 then moves to block 270 and ends.

While the hardware pay-per-use system and corresponding method have been described in connection with exemplary embodiments, one of ordinary skill in the art will readily recognize that the concepts discussed herein may be extended to other variations and embodiments, and that this application would cover those variations.

What is claimed is:

1. A method for pricing hardware on a pay-per-use basis, wherein one or more hardware products are coupled to a communications network, comprising:
    acquiring, in a hardware device separate from the one or more hardware products, metrics data related to an operation of the one or more hardware products on a periodic basis;
    determining data to report based on the acquiring step;
    sending the determined data to a usage repository;
    generating a usage report; and
    generating a pay-per-use invoice based on the usage report.

2. A method for pricing hardware on a pay-per-use basis, wherein one or more hardware products are coupled to a communications network, comprising:
    acquiring, in a hardware device separate from the one or more hardware products, metrics data related to an operation of the one or more hardware products on a periodic basis;
    determining data to report based on the acquiring step;
    sending the determined data to a usage repository; and
    receiving a pay-per-use invoice, wherein the pay-per-use invoice is based on receiving
    a pay-per-use invoice, wherein the pay-per-use invoice is based on the data sent to the usage repository.

3. A method for pricing hardware on a pay-per-use basis, wherein one or more hardware products are at a node coupled to a communications network, comprising:
    receiving, at a usage repository, metrics data based on an operation of the one or more hardware products, wherein the metrics data are provided by a metering mechanism separate from the one or more hardware products on a periodic basis;

determining data to report based on the metrics data;

generating a usage report based on the determined data;

generating a pay-per-use invoice based on the usage report; and presenting the invoice to the node.

4. The method of claim 3, further comprising receiving a payment on the invoice.

5. The method of claim 3, wherein generating the usage report, comprises:

applying one or more rules to the metrics data, wherein application of the rules processes the metrics data into a data structure representing an operation of the one or more hardware products.

6. The method of claim 5, wherein generating the pay-per-use invoice comprises comparing the usage reports to a pay-per-use pricing plan, wherein the pricing plan specifies a finance rate component based on the metrics data.

7. The method of claim 6, wherein the finance rate component varies with variations in the metrics data.

8. The method of claim 5, wherein the received metrics data is determined based on one or more supplied business rules.

9. The method of claim 8, wherein the operation relates to central processor utilization over a given time interval, and wherein an applied business rules require reporting a peak utilization over the time interval.

10. A hardware pay-per-use system, comprising:

one or more hardware products;

a metering mechanism coupled to at least one of the one or more hardware products, wherein the metering mechanism includes a hardware device separate from the one or more hardware products, wherein the metering mechanism acquires metrics data from the one or more hardware products, the metrics data related to an operation at the one or more hardware products, and wherein the metering mechanism determines data to report on the operation of the one or more hardware products; and a usage repository coupled to the metering mechanism, the usage repository receiving the determined data and generating usage reports related to the operation of the one or more hardware products;

wherein the one or more leased hardware products provide the metrics data on a periodic basis.

11. The system of claim 10, further comprising a billing and accounting system, coupled to the usage repository, the billing and accounting system receiving the usage reports, wherein a pay-per-use invoice is determined based on the usage reports.

12. The system of claim 11, further comprising a portal coupled to the usage repository and the billing and accounting system, wherein the portal, comprises:

a usage reports mechanism, wherein the usage reports are displayable;

an invoice presentation mechanism, wherein the invoice is presentable; and an invoice payment mechanism, wherein a payment on the invoice is receivable.

13. The system of claim 10, wherein the usage repository, comprises:

a validation server; and a usage database coupled to the validation server, wherein the validation server validates the determined data received at the usage repository and verifies a correct configuration of the one or more hardware products, and wherein the usage database stores the determined data and the usage reports.

14. The system of claim 10, wherein the metering mechanism is a rack-mountable hardware device in a networked computer system.

15. The system of claim 10, wherein the metering mechanism is a standalone computer.

16. The system of claim 10, wherein the metering mechanism is a part of a server coupled to the one or more hardware products.

17. The system of claim 10 wherein one or more of the one or more hardware products comprise metering agents that collect the metrics data acquired by the metering mechanism.

18. The system of claim 10, wherein the metering mechanism comprises a rules engine, and wherein rules in the rules engine are used to determine the data to report.

19. The system of claim 10, wherein the metering mechanism comprises a polling engine, wherein the metering mechanism polis the one or more hardware products to acquire the metrics data.

20. The system of claim 10, wherein the operation is central processor unit (CPU) utilization.

21. The system of claim 10, wherein the one or more hardware products are leased.

22. The system of claim 10, wherein the metering mechanism is located at a first site, which is a same site as the one or more hardware products, and the usage repository is located at a second site remote from the first site.

23. The system of claim 22, wherein the first site and the second site are Internet Web sites.

24. The system of claim 10, wherein the metering mechanism and the usage repository are located at a site remote from the one or more hardware products.

25. A pay-per-use hardware financing plan, comprising:

providing a hardware product to a client at a client site;

providing a pay-per-use plan, the plan based on at least one metric acquired from the hardware product; and providing the client site with a mechanism, separate from the hardware product, that acquires the at least one metric, and transmits the at least one metric to a remote site remote from the client site;

wherein the at least one metric is transmitted to the remote site on a periodic basis.

26. The pay-per-use hardware financing plan of claim 25, wherein the mechanism polls the hardware product to obtain the at least one metric.

27. The pay-per-use hardware financing plan of claim 25, further comprising:

generating a usage report based on the at least one metric;

computing a pay-per-use invoice based on the at least one metric; and presenting the client with the pay-per-use invoice.

28. The pay-per-use hardware financing plan of claim 27, further comprising making the usage report available to the client.

29. The pay-per-use hardware financing plan of claim 25, wherein the periodic basis is daily.

30. The pay-per-use hardware financing plan of claim 25, wherein an initial configuration of the hardware product is stored at the remote location, and wherein the remote site:

validates the at least one metric; and verifies a current configuration of the hardware product matches the initial configuration.

31. The pay-per-use hardware financing plan of claim 25, further comprising providing a software metering agent with the hardware product.

32. A hardware pay-per-use system, comprising:
  means for receiving metrics data from the one or more hardware products on a periodic basis;
  means, coupled to the receiving means, for computing usage and billing data from the received metrics data;
  means, coupled to the computing means, for generating an invoice based on the computed usage and billing data.

33. The system of claim 32, wherein one or more hardware products are leased to a client for installation at a client site.

34. The system of claim 33, wherein the client site is a site on a digital communications network.

35. The system of claim 32, wherein the receiving means, comprises:
  means for validating the received metrics data;
  means for verifying a configuration of the one or more hardware products; and
  means for storing the metrics data and the configuration.

36. The system of claim 32, further comprising:
  means, coupled to the one or more hardware products, for obtaining the metrics data from the one or more hardware products, comprising:
    means, installed in the one or more hardware products, for collecting the metrics data, and means, coupled to the collecting means, for acquiring the collected metrics data, wherein the acquiring means is a standalone hardware device separate from the hardware products.

37. The system of claim 32, further comprising:
  means, coupled to the generating means, for generating a usage report based on the received usage data; and
  means for presenting the usage report to a client.

38. The system of claim 32, further comprising:
  means for presenting the invoice to a client; and
  means for receiving a payment from the client based on the invoice.

39. The hardware pay-per-use system of claim 32, wherein at least one of the one or more hardware products includes bundled software, and wherein the means for generating the invoice includes means for pricing utilization of the bundled software based on hardware metrics data.

\* \* \* \* \*